United States Patent [19]

David et al.

[11] Patent Number: 4,540,086
[45] Date of Patent: Sep. 10, 1985

[54] GRAIN AUGER CLOSING SPOUT

[76] Inventors: Gary L. David, P.O. Box 7102, Wichita, Kans. 67207; David W. Harrington, 2621 W. Central, Wichita, Kans. 67203

[21] Appl. No.: 600,364

[22] Filed: Apr. 16, 1984

[51] Int. Cl.³ ............................................. B65G 47/44
[52] U.S. Cl. ................................... 198/536; 198/671
[58] Field of Search ............... 198/535, 536, 861, 671, 198/311; 222/58, 77, 413; 414/526; 119/56 R

[56] References Cited

U.S. PATENT DOCUMENTS

| | | | |
|---|---|---|---|
| 1,503,335 | 7/1924 | Rose | 119/56 R |
| 1,615,334 | 1/1927 | MacGregor | 198/536 |
| 1,741,782 | 12/1929 | Rocque | 198/535 |
| 2,538,413 | 1/1951 | Chard | 119/56 R |
| 2,678,717 | 5/1954 | Lucas | 198/536 |
| 2,818,163 | 12/1957 | Hilblom et al. | 198/536 |

Primary Examiner—Joseph E. Valenza
Assistant Examiner—Darrell G. Dayoan
Attorney, Agent, or Firm—Edward L. Brown, Jr.

[57] ABSTRACT

An automatic closing spout for a combine grain auger which opens when there is grain passing through the auger comprising a pivotally mounted collecting bucket attached adjacent the discharge opening of the auger with counterweighted arms extending outwardly from the collecting bucket to hold the bucket in a closed position, but insufficient when the bucket is full of grain from dumping and allowing grain to discharge from the auger housing and including a secondary closing means in the form of a permanent magnet which holds the collecting bucket in its closed position to prevent premature discharge therefrom.

10 Claims, 6 Drawing Figures

GRAIN AUGER CLOSING SPOUT

BACKGROUND OF THE INVENTION

The invention is directed to an automatic grain spout on a combine unloading auger which opens when the auger is in motion and closes when the auger is not in motion, so as to prevent the loss of any grain situated in the auger when the auger stops turning. All of the combines on the market today merely disengage the drive on the auger after the auger is utilized. All of the grain remaining in the horizontal auger tube is left between the auger flights and the auger housing which gradually leaks out the discharge opening, between the auger flights and the housing as the combine moves across a typical rough surface grain field. While the rate at which the grain leaks from the auger is small, it is a continuous loss and over a period of time amounts to a substantial number of bushels of grain wasted on the ground. The closing spout of the present invention prevents this gradual loss by sealing the auger opening with a collecting bucket which retains all of the grain which has vibrated or leaked its way past the flights of the auger. When the auger is again actuated, it will fill the collecting bucket until there is a sufficient weight or force from the moving grain to overcome the counterweights which are holding the spout closed at which time the collecting bucket swings open and remains in this position as long as there is a substantial flow of grain out the discharge opening. When the auger is disengaged, the empty collecting bucket swings upward to its closed position until the auger is again actuated.

The universal closing spout of the present invention can be adjusted with the use of shims to fit differing diameter auger housings.

It is therefore the principal object of the present invention to provide an automatic grain closing spout for use on combine unloading augers which is actuated by the weight of grain or absence thereof in the auger.

Another object of the present invenion is to provide an automatic closing spout which can be universally used on all combines.

For a more complete understanding of the nature and scope of the invention, reference may now be had to the following detailed description taken in conjunction with the accompanying drawings wherein.

DESCRIPTION OF THE PREFERRED EMBODIMENT OF THE DRAWINGS

Figure 1:
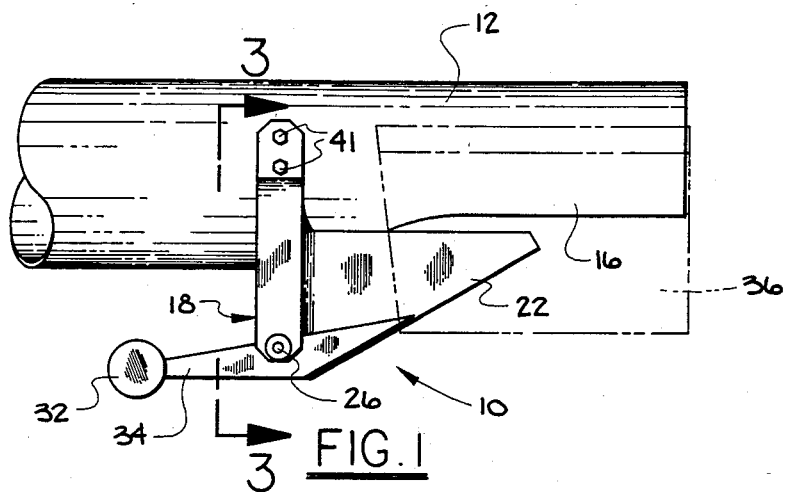
FIG. 1 is a side elevational view of the closing spout mounted on an auger tube in the closed position.
Figure 3:
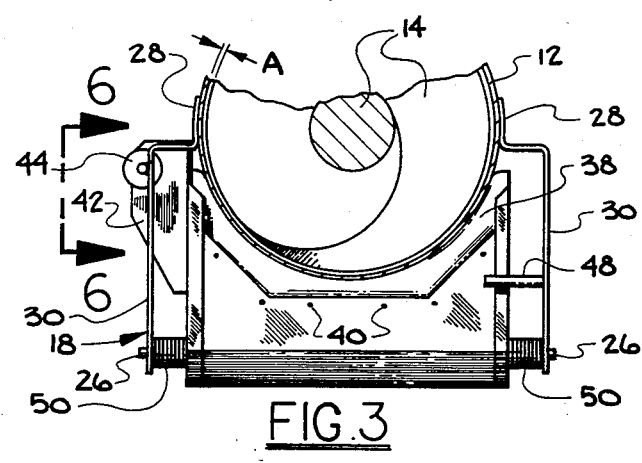
FIG. 3 is a partial lateral section taken along lines 3—3 of FIG. 1.

Turning now more particularly to FIG. 1, the closing spout of the present invention is generally described by reference numeral 10 which is illustrated mounted on a conventional auger housing 12 which has a screw-type auger 14, as seen in FIG. 3, passing down the center thereof and a discharge opening 16 located at the lower right end of housing 12. Surrounding discharge opening 16 on three sides is a conventional rubber deflector boot 36 which is used to deflect the grain exiting opening 16 in a downward direction. While not shown in the drawing, a combine unloading auger dumps its grain either into a truck or grain cart which is positioned directly under the discharge opening 16.

Figure 4:
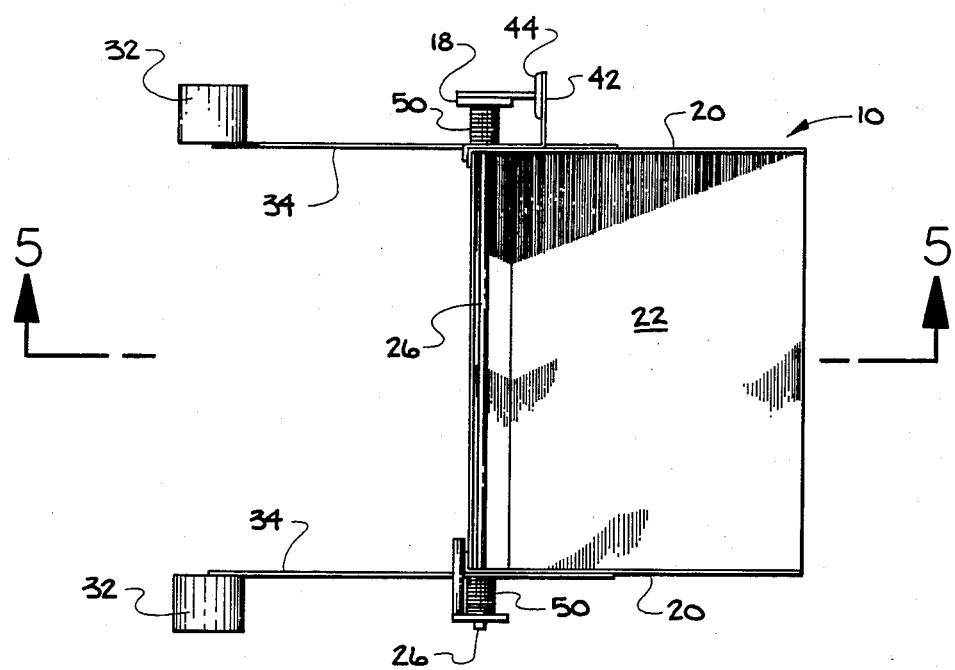
FIG. 4 is a top plan view of the closing spout.
Figure 5:
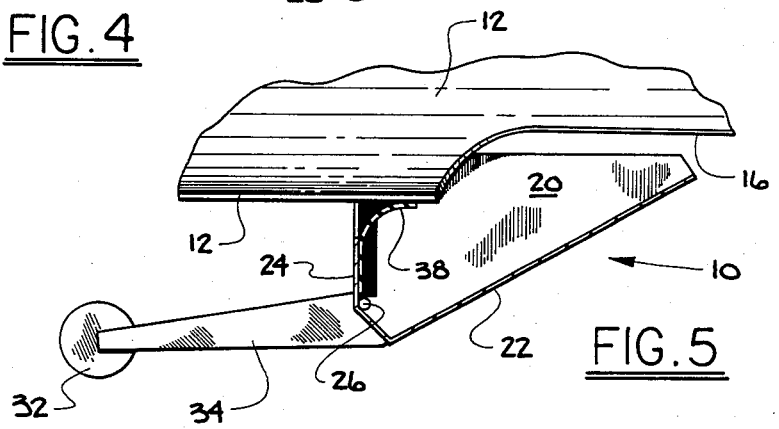
FIG. 5 is a sectional view taken along lines 5—5 of FIG. 4.
Figure 6:
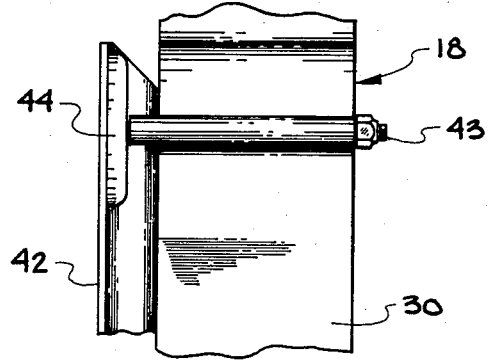
FIG. 6 is a partial elevational view to an enlarged scale taken along lines 6—6 of FIG. 3.

The closing spout 10, also referred to as a collecting bucket, is pivotally mounted to a pair of mounting brackets 18 through an axle 26 which passes through the spout 10, as best seen in FIGS. 4 and 5. The spout 10 is shaped as a collecting bucket and includes a pair of side walls 20, a slanted bottom 22, and a back wall 24. Attached to the upper portions of back wall 24 is a flexible rubber seal 38, as can be seen in FIGS. 3 and 5, which provides a seal between the back of the closing spout and the bottom of the auger housing 12. Seal 38 is attached to the sheet metal back wall 24 through a series of rivets or fasteners 40, as shown in FIG. 3. Extending rearwardly from the closing spout 10 are a pair of counterweights 32 attached through a pair of arms 34, one mounted on each side of the spout. In viewing FIG. 5, the moment created by weight 32 attempts to rotate the spout in a counterclockwise direction which is greater than the moment created by the empty weight of the bucket-shaped spout 10.

The mounting brackets 18 include a curved mounting pad 28 which is attached directly to the auger housing 12 by a pair of bolts 41. The mounting brackets 18 include an offset lower portion 30, as seen in FIG. 3, which allows the closing spout or collecting bucket 10 to be at least the width of the largest diameter auger housing in which the closing spout is utilized. Attached to the left mounting bracket 18, as seen in FIG. 3, is a permanent magnet 44 which is attached to bracket 18 through a concentrically positioned bolt 43. The magnet 44 comes in contact with an angular-shaped strike plate 42, mounted on the side of spout 10, when the closing spout 10 is in its fully closed position, as seen in FIGS. 1, 3, 4, 5 and 6. The force of magnet 44 helps retain the spout 10 closed when the combine hits bumps and holes while crossing a field.

Figure 2:
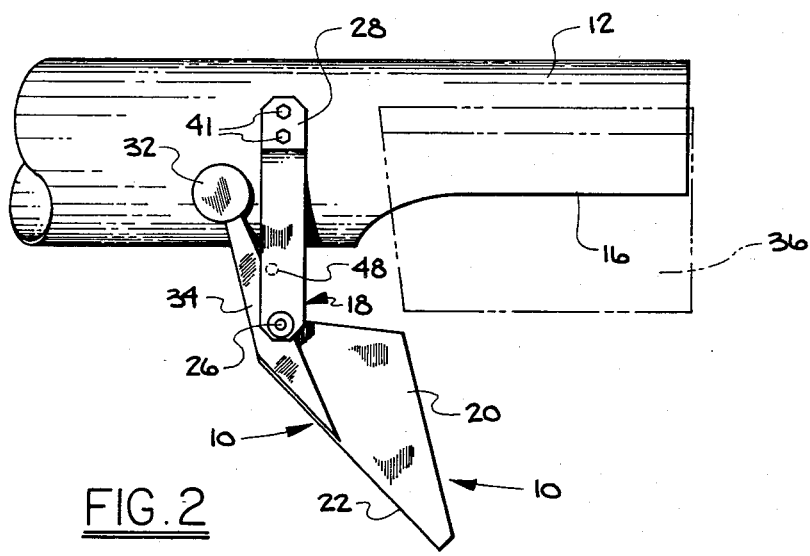
FIG. 2 is a similar side elevational view with the closing spout in the open position.

Attached to the opposite mounting bracket 18, as seen in FIG. 3, is a stop member 48 which limits the downward tilting angle of bucket 10, when arm 34 comes in contact with the stop, as illustrated in FIG. 2.

OPERATION

To unload grain from the combine, the operator engages the auger screw 14 through some form of clutch drive means, not shown in the drawing, and the auger screw 14 begins to turn. This forces the grain in a rightward direction, as fiewed in FIG. 5 of the drawing, out through the auger housing 12 through opening 16, causing the bucket 10 to fill with grain. Since the pivot point of the spout 10 is located approximate its back wall, the weight of the filling grain creates a moment attempting to swing the spout 10 downward in a clockwise direction. When the moment created by the grain build-up exceeds the moment force of counterweights 32 and the force of permanent magnet 44, the spout 10 breaks away, swinging downward to its FIG. 2 open position. Once the magnet 44 is separated from plate 42 and the counterweight 32 is in its elevated position, the closing moment attempting to swing the spout 10 closed is substantially reduced with only a small amount of grain flowing out of opening 16 being required to hold the spout 10 open.

When the operator desires to stop the auger, the screw 14 is disengaged and the grain flow out of opening 16 ceases, thereby eliminating the opening moment and allowing the closing moment from counterweight 32 to swing the spout 10 in a counterclockwise direction, as viewed from FIG. 2, to the fully closed position of FIG. 1 wherein magnet 44 has engaged plate 42, as seen in FIG. 4. In this closed position, the rubber seal 38 surrounding the bottom periphery of auger housing 12 prevents any accumulated grain in the spout 10 from leaking out the back edge thereof. As the combine traverses the field, the bouncing and vibration allows the grain remaining in the horizontal auger housing 12 to pass between the flights of the auger 14 and the housing 12 through a dimension A, as illustrated in FIG. 3, which at times can be greater than one-quarter inch. This grain which sifts past the flights of auger screw 14 will be collected in spout 10 and will not be sufficient in weight to open the spout prematurely.

If it is desirous to use the spout 10 on a combine auger having a smaller diameter housing 12 than that illustrated in FIG. 3, it is only necessary to remove the necessary number of shims 50 so that the mounting brackets can adapt to the lesser diameter housing 12.

The detailed description of the preferred embodiment set forth above is exemplary in nature and is not to be considered as limiting to the scope and spirit of the invention as set forth in the accompanying claims.

Having described the invention with sufficient clarity that those skilled in the art may make and use it, what is claimed as new and desired to be secured by Letters Patent is:

1. A grain auger closing spout for use on a combine auger housing which automatically opens when the auger is running and closes when the auger stops, comprising:
   a collecting bucket including side walls, slanted bottom and a back wall;
   flexible seal means forming an extension of the back wall to seal the collecting bucket against the auger housing in the closed position;
   a pair of mounting brackets attached to the auger housing;
   pivot means attaching the collecting bucket to the mounting brackets, one mounted on each side of the auger housing; and
   counterweight means carried on arms attached to the bucket extending away from the bucket and pivot means tending to pivot the bucket upward to its closed position when the bucket is empty but insufficient when the bucket is full from pivoting downward to dump the contained grain in its open discharge position.

2. A grain auger closing spout as set forth in claim 1, wherein the pivot means is attached to the collecting bucket approximate its back wall whereby the center of the bucket is offset in a position tending to dump the bucket.

3. A grain auger closing spout as set forth in claim 1, wherein the slanted bottom of the bucket in its closed position is positioned at an approximate 45° angle to a horizontal position.

4. A grain auger closing spout as set forth in claim 1, wherein the pivot means attaching the collecting bucket to the mounting brackets includes adjustable width shim means so that the closing spout can be mounted on differing diameter auger housings.

5. A grain auger closing spout as set forth in claim 1, wherein the pivot means is attached approximate the back wall of the collecting bucket with the counterweight arms being positioned with a maximum moment arm length when the closing spout is in the closed position.

6. A grain auger closing spout as set forth in claim 1, including permanent magnet means attached to the mounting bracket such that a portion of the collecting bucket engages the magnet means in the closed position.

7. A grain auger closing spout as set forth in claim 1, wherein the counterweight means and attaching arms are so positioned that a maximum moment is applied to the collecting bucket in its fully closed position with a decreasing counterweight moment being applied as the collecting bucket moves towards its fully open position.

8. A grain auger closing spout as set forth in claim 1, wherein the slanted bottom of the bucket terminates at the front edge of the bucket and the pivot means is attached approximate the back wall of the bucket.

9. A grain auger closing spout as set forth in claim 1, including a stop member on one of the mounting brackets limiting the open position of the collecting bucket's bottom to at least 20° for a vertical position.

10. A grain auger closing spout as set forth in claim 1, including a stop member which limits the angular movement of the collecting bucket from fully closed to fully open to less than 90°.

* * * * *